United States Patent [19]

Seki et al.

[11] Patent Number: 5,180,941
[45] Date of Patent: Jan. 19, 1993

[54] VIBRATION DRIVEN MOTOR APPARATUS

[75] Inventors: Hiroyuki Seki, Urawa; Atsushi Kimura, Yokohama, both of Japan

[73] Assignee: Canon Kabushiki Kaisha, Tokyo, Japan

[21] Appl. No.: 611,888

[22] Filed: Nov. 8, 1990

[30] Foreign Application Priority Data

Nov. 10, 1989 [JP] Japan .................................. 1-293127

[51] Int. Cl.$^5$ ............................................ H01L 41/08
[52] U.S. Cl. ...................................................... 310/323
[58] Field of Search ............................... 310/323, 328

[56] References Cited

U.S. PATENT DOCUMENTS

| | | | |
|---|---|---|---|
| 4,569,373 | 12/1985 | Tokusima et al. | 310/323 |
| 4,634,916 | 1/1987 | Okada et al. | 310/323 |
| 4,672,256 | 6/1987 | Okuno et al. | 310/323 |
| 4,882,500 | 11/1989 | Iijima | 310/323 |
| 4,937,488 | 6/1990 | Fujie et al. | 310/323 |
| 4,945,275 | 7/1990 | Honda | 310/323 |
| 4,959,579 | 9/1990 | Kuwabara et al. | 310/323 |
| 4,978,882 | 12/1990 | Kitani | 310/328 |
| 5,013,958 | 5/1991 | Ohnishi et al. | 310/323 |
| 5,036,245 | 7/1991 | Ohnishi et al. | 310/323 |

FOREIGN PATENT DOCUMENTS 0224680 9/1988 Japan .................................. 310/323

*Primary Examiner*—Mark O. Budd
*Attorney, Agent, or Firm*—Fitzpatrick, Cella, Harper & Scinto

[57] ABSTRACT

A vibration wave driven apparatus disclosed in this specification frictionally drives a first member having mounted thereon an elastic member in which a travelling vibration wave is formed and a second member provided with a rail-like stator which is in pressure contact with the elastic member, along the lengthwise direction of the rail-like stator, by the travelling vibration wave formed in the elastic member. Further, the apparatus has a guide member for restraining the degree of freedom in a direction orthogonal to the lengthwise direction, the guide member being comprised of a roller and a guide portion against which the roller bears and which extends along the direction of relative movement.

8 Claims, 3 Drawing Sheets

VIBRATION DRIVEN MOTOR APPARATUS

BACKGROUND OF THE INVENTION

1. Field of the Invention

This invention relates to a vibration driven motor apparatus.

2. Related Background Art

As a prior-art vibration driven motor apparatus, there is one as shown, for example, in FIGS. 5 and 6 of the accompanying drawings.

In FIG. 5, the reference number 18 designates an elastic member formed of a metal material formed into an elliptical shape having two arcuate portions and two straight portions and having a piezo-electric element group 21 joined to the underside thereof. The elastic member 18 is supported on a substrate 22, for example, through a vibration insulating member 19 formed of felt. Guide shafts 23 are fixed to the widthwise opposite end portions of the substrate 22, and linear bearings 24 extend through these shafts, respectively. These linear bearings 24 are fixed to the opposite end portions of moving member 20 which is movable along the lengthwise direction of the shafts 23 indicated by arrow A. A leaf spring 25 is fixed to the underside of the moving member 20 correspondingly to the straight portion of the elastic member 18, and a friction plate 26 is fixed to the spring end portion of the leaf spring 25 as by a bolt, and is brought into pressure contact with the elastic member 18 by the spring force of the leaf spring 25.

According to such structure, the elastic member 18 generates a travelling wave upon application of an AC voltage to the piezo-electric element group 21, and even if it slides vertically and to left and right on the vibration insulating member, the moving member 20 is driven only in the direction of arrow A by the elastic member 18 because it is held between the bearings 24, and the moving member 20 effects rectilinear movement.

In the above-described example of the prior art, however, linear bearings are used as bearings, and where these bearings are linear ball bearings, there has been the problem that although bearing resistance is small, the apparatus is costly and is not free of the sliding sound of balls Also, where the bearings are slide bearings, a reaction force which presses the friction plate 26 against the elastic member 18 is applied to the bearings, and this has led to the problem that bearing resistance becomes great.

SUMMARY OF THE INVENTION

It is an object of the present invention to solve the above-noted problems peculiar to the prior art and to provide a vibration driven motor apparatus which can achieve smooth movement and a reduction in cost.

Other objects of the present invention will become apparent from the following detailed description of the invention.

DESCRIPTION OF THE PREFERRED EMBODIMENTS

Figure 1:
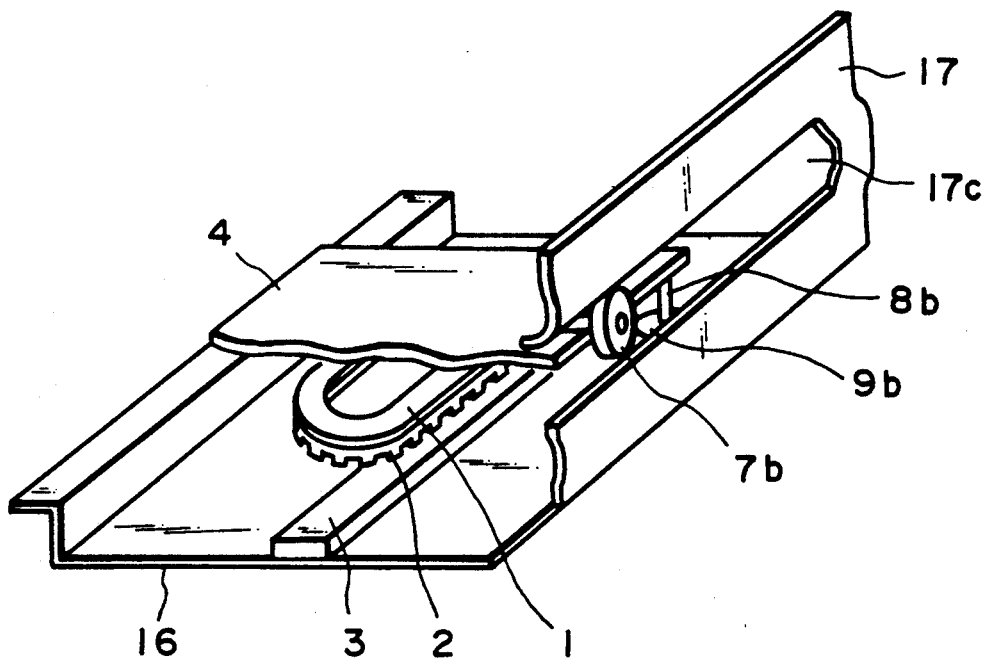
FIG. 1 is a perspective view showing an embodiment of a vibration driven motor apparatus according to the present invention.
Figure 2:
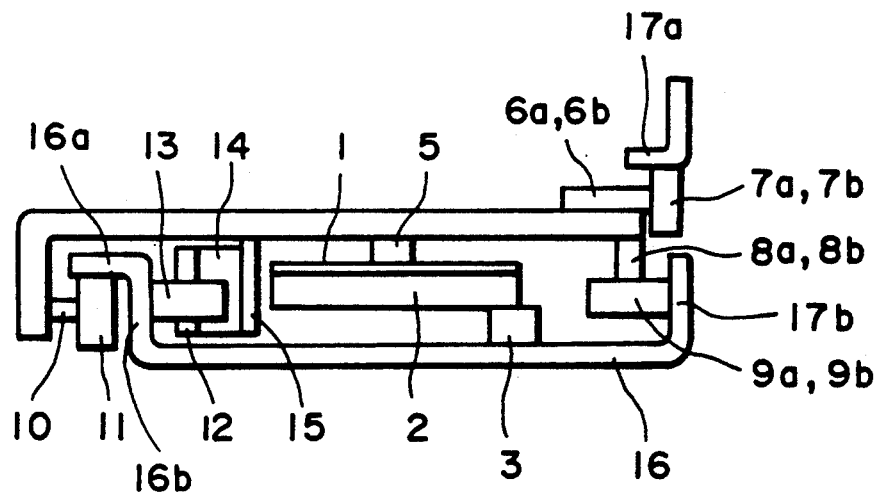
FIG. 2 is a cross-sectional view of the FIG. 1 motor apparatus.
Figure 3:
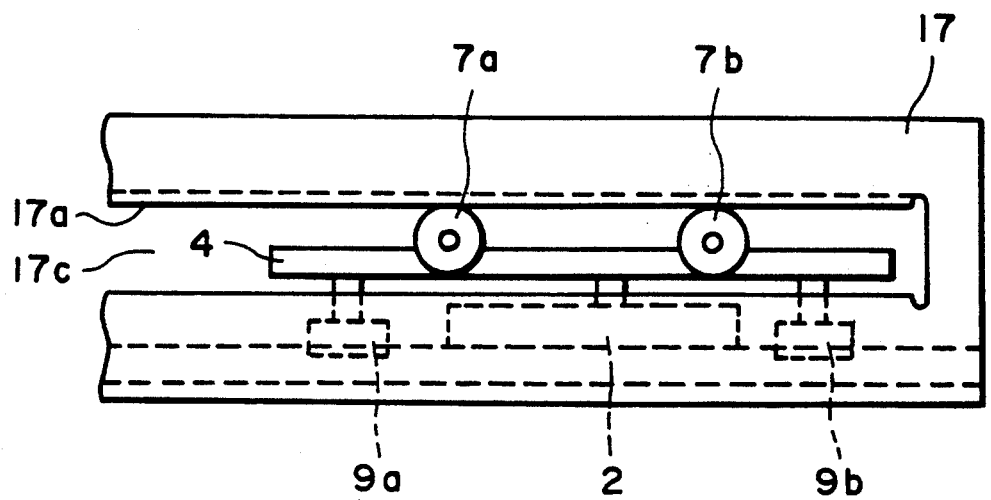
FIG. 3 is a side view of the FIG. 1 motor apparatus.

FIGS. 1 to 3 show an embodiment of a vibration driven motor apparatus according to the present invention.

The reference number 16 designates a fixed plate, and the reference number 4 denotes a movable plate. The elastic member 2 of a vibration wave motor is supported on the movable plate 4 in such a manner as to be suspended through a support member 5, and the movable plate 4 is brought into pressure contact with a slide rail 3 fixed to the fixed plate 16, by a pressing spring, not shown. This vibration wave motor is of a conventional type, and has an electromechanical energy conversion element 1 comprising a piezo-electric or electrostrictive element, such as PZT or the like, and joined to the upper surface of the elastic member 2 having arcuate portions and straight portions, and forms a travelling vibration wave on the elastic member 2 by AC voltages having a phase difference of 90 degrees in time being applied to two groups of driving piezo-electric elements. The support member 5 is adapted not to hamper the vibration of the elastic member 2. Travelling waves formed on the opposed straight portions of the elastic member 2 are opposite in direction to each other and therefore, only one of the straight portions is brought into pressure contact with the slide rail 3.

On one side (the right side as viewed in FIG. 2) of the movable plate 4, two first rollers 7a and 7b for restraining the upward position of the movable plate are provided in spaced-apart relationship along the direction of movement of the movable plate, and two second rollers 9a and 9b for restraining the horizontal rightward position of the movable plate are provided in spaced-apart relationship along the direction of movement of the movable plate. The shaft rods 6a and 6b of the first rollers 7a and 7b, respectively, are horizontally fixed to the movable plate 4, and the shaft rods 8a and 8b of the second rollers 9a and 9b, respectively, are vertically fixed to the movable plate 4, and each of these rollers is rotatable.

On the other side (the left side as viewed in FIG. 2) of the movable plate 4, a third roller 11 for restraining the upward position of the movable plate is provided between the first rollers 7a and 7b, and a fourth roller 13 for restraining the horizontal leftward position of the movable plate is provided in spaced-apart and opposed relationship with the third roller 11. The shaft rod 10 of the third roller 11 is horizontally fixed to the movable plate 4, and the fourth roller 13 is rotatably mounted on the spring end portion of a pressing spring 14 whose spring force acts in a horizontal direction, through the shaft rod 12 thereof, and the pressing spring 14 is fixed to the spring mounting portion 15 of the movable plate 4 and biases the fourth roller 13 in a horizontal direction.

On the other hand, the right side plate 17 of the fixed plate 16 is formed with a slot 17c along the lengthwise direction thereof for fitting the two first rollers 7a and 7b therein, and the left side end portion of the fixed plate is bent into an inverted L-shape between the third roller 11 and the fourth roller 13, and the third roller 11 and the fourth roller 13 are biased into contact with a horizontal guide portion 16a and a vertical guide portion 16b, respectively, by the spring 14, and press the movable plate 4 generally rightwardly. The two second rollers 9a and 9b are pressed against the inner side 17b of the right side plate 17 by the spring force of the aforementioned spring 14 and thus, the degree of freedom of the movable plate 4 in a horizontal direction is restrained.

Also, by the upward reaction force of the aformentioned pressing spring which presses the elastic member 2 against the slide rail 3, the two first rollers 7a and 7b are brought into contact with the upper inner end surface 17a of the slot 17c and the third roller 11 is brought into contact with the horizontal guide portion 16a and thus, the degree of freedom of the movable plate 4 in a vertical direction is restrained and the movable plate 4 is movable only in the lengthwise direction of the slide rail 3.

Since one of the straight portions of the elastic member 2 is in pressure contact with the rail 3, the elastic member 2 is subjected to a moving force in the lengthwise direction of the rail by a frictional force created by a travelling wave excited by a conventional method. For example, photosensors or the like are provided on the opposite ends of the side plate 17, and when the arrival of the movable plate 4 at the end portions of the rail is detected by the photosensors or the like, the phases of an electric field of two phases supplied to the piezo-electric element 1 is inverted (that is, $+\pi/2 \rightarrow -\pi/2$ or $-\pi/2 \rightarrow +\pi/2$), whereby the direction of the travelling wave can be changed to reciprocally drive the movable plate 4.

Figure 4:
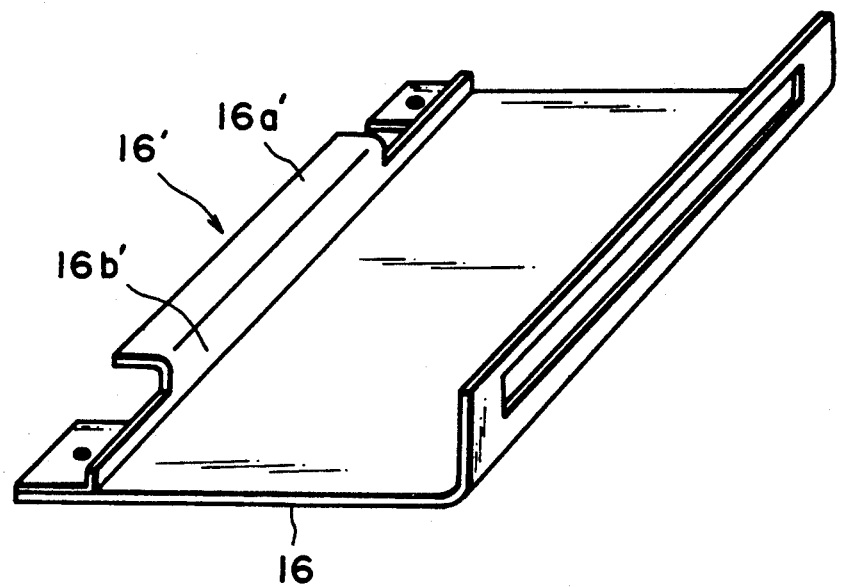
FIG. 4 is a perspective view showing another embodiment of the present invention.
Figure 5:
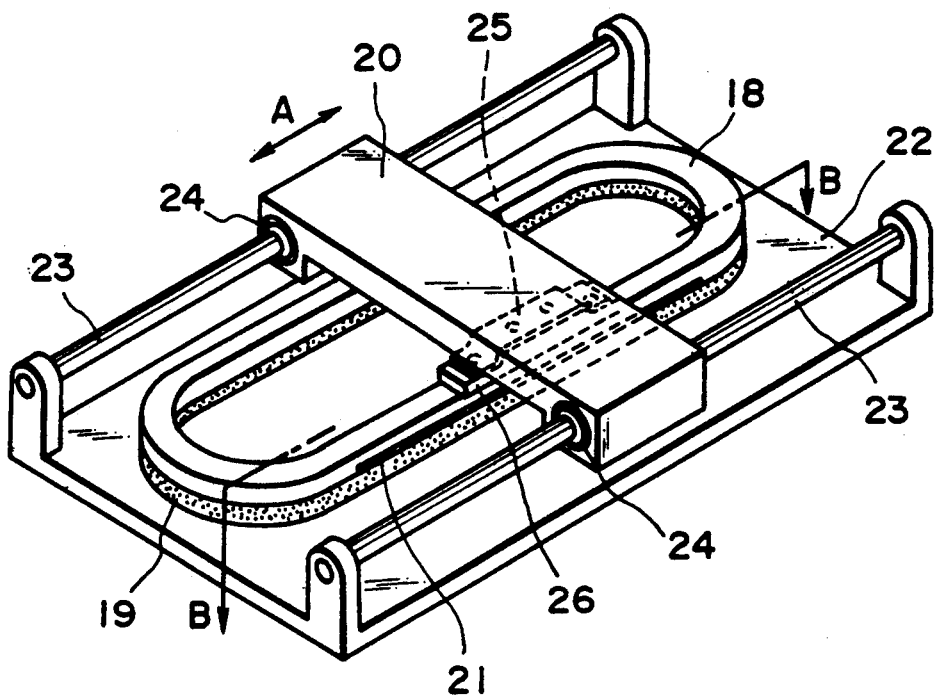
FIG. 5 is a perspective view of a vibration driven motor apparatus according to the prior art.
Figure 6:
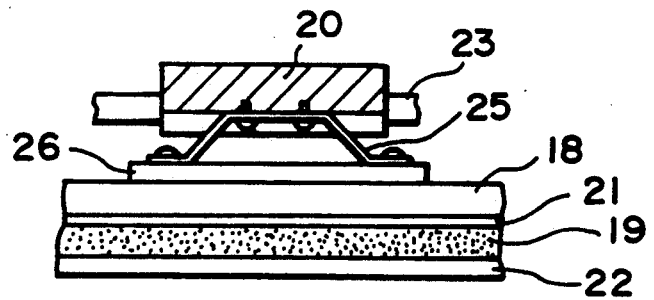
FIG. 6 is a cross-sectional view of the FIG. 5 motor apparatus.

FIG. 4 shows another embodiment of the present invention applied to a printer. In the embodiment shown in FIGS. 1 and 2, the guide portions 16a and 16b with which the third and fourth rollers 11 and 13 are in contact are worked integrally with the fixed plate 16, but where they cannot be worked integrally with the fixed plate 16 because the fixed plate 16 is fixed to a portion of an other apparatus, for example, a printer, guide portions 16'a and 16'b may be worked as a discrete plate 16', as shown in FIG. 4, and the plate 16' may be fixed to the fixed plate 16, e.g., by bolts.

Although not shown, the shape of the elastic member is not limited to the track-like shape, but a ring-shaped or disk-shaped vibration member may be used and a portion thereof may be brought into contact with the rail, and the movable plate may be reciprocally driven by the utilization of a drive force of a component in the tangential direction.

Also, the movable plate 4 having the elastic member 1 may be fixed and the fixed plate 16 may be made movable, and in that case, the rollers may be provided on the opposite side plate.

As has hitherto been described, according to the present invention, without using linear bearings such as linear ball bearings heretofore used, the relative movement of the first and second members can be guided by rollers and therefore, a reduction in cost can be achieved. Particularly the guide portion of the guide means and the first or second member can be formed integrally with each other, and this leads to a further reduction in cost.

Also, use of the rollers eliminates the problem experienced in the conventional slide bearings where the bearing resistance becomes so great as to prevent smooth movement from being accomplished, and leads to the accomplishment of smooth movement.

We claim:
1. A vibration driven motor, comprising:
a vibration member responsive to an applied electrical signal for generating a vibration therein;
a contact member which is in contact with said vibration member, the vibration generated in said vibration member effecting relative movement between said vibration member and said contact member;
a support member for movably supporting one of said vibration member or said contact member;
a first and second roller arrangements functionally engaged with said support member;
a first guide member in contact with said first roller arrangement, said first guide member preventing said first roller arrangement from sliding in a horizontal direction; and
a second guide member in contact with said second roller arrangement, said second guide member preventing said second roller arrangement from sliding in a vertical direction.

2. A vibration driven motor according to claim 1, wherein said first roller arrangement includes a pair of separate roller elements.

3. A vibration driven motor according to claim 1, wherein said second roller arrangement includes a pair of separate roller elements.

4. A vibration driven motor according to claim 1, wherein said first and second guide members are constructed in a single body.

5. A vibration device motor according to claim 2, further comprising a first abutting member for abutting one of the roller elements of said first roller arrangement in a first direction.

6. A vibration driven motor according to claim 5, further comprising a second abutting member for abutting the other one of the roller elements of said first roller arrangement in a second direction opposite the first direction.

7. A vibration driven apparatus, comprising:
a vibration member responsive to an applied electrical signal for generating a vibration therein;
a contact member which is in contact with said vibration member, the vibration generated in said vibration member effecting relative movement between said vibration member and said contact member;
a support member for movably supporting one of said vibration member or said contact member;
a first and second roller arrangements functionally engaged with said support member;
a first guide member in contact with said first roller arrangement, said first guide member preventing said first roller arrangement from sliding in a horizontal direction; and
a second guide member in contact with said second roller arrangement, said second guide member preventing said second roller arrangement from sliding in a vertical direction.

8. A vibration driven apparatus according to claim 7, wherein said first and second guide members are constructed in a single body.

* * * * *

UNITED STATES PATENT AND TRADEMARK OFFICE
CERTIFICATE OF CORRECTION

PATENT NO. : 5,180,941

DATED : January 19, 1993

INVENTOR(S) : SEKI ET AL.

It is certified that error appears in the above-identified patent and that said Letters Patent is hereby corrected as shown below:

COLUMN 3

Line 11, "aformen-" should read --aforemen- --.
    Line 63, "Particularly" should read --Particularly,--.

COLUMN 4

Line 2, "bearings where" should read --bearings, where--.
    Line 16, delete "a".
    Line 35, "device" should read --driven--.
    Line 53, delete "a".

Signed and Sealed this

Seventh Day of December, 1993

Attest:

BRUCE LEHMAN

Attesting Officer      Commissioner of Patents and Trademarks